(12) United States Patent
Hagano et al.

(10) Patent No.: US 6,543,833 B2
(45) Date of Patent: Apr. 8, 2003

(54) CAP DEVICE

(75) Inventors: Hiroyuki Hagano, Nishikasugai-gun (JP); Masayuki Nakagawa, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/891,177

(22) Filed: Jun. 26, 2001

(65) Prior Publication Data

US 2001/0054829 A1 Dec. 27, 2001

(30) Foreign Application Priority Data

Jun. 26, 2000 (JP) ........................................ 2000-190697
Jul. 3, 2000 (JP) ........................................ 2000-200744

(51) Int. Cl.[7] ............................................. B65D 55/16
(52) U.S. Cl. .............. 296/97.22; 220/375; 220/DIG. 33
(58) Field of Search ...................... 296/97.22; 220/375, 220/288, DIG. 33, 86.2, 379

(56) References Cited

U.S. PATENT DOCUMENTS 4,705,190 A * 11/1987 Mizusawa ................... 220/375
5,462,190 A * 10/1995 Lienhart et al. ....... 296/97.22 X
6,237,798 B1 * 5/2001 Sung ........................... 220/375
6,332,553 B1 * 12/2001 Yamada et al. ....... 296/97.22 X

FOREIGN PATENT DOCUMENTS

| JP | 61-202923 | * | 9/1986 |
| JP | 62-173321 | A | 7/1987 |
| JP | 03-24922 | U | 3/1991 |
| JP | 09-002084 | | 1/1997 |

* cited by examiner

Primary Examiner—Joseph D. Pape
(74) Attorney, Agent, or Firm—Law Office of David G. Posz

(57) ABSTRACT

In a cap device, a long, flexible coupling member is coupled at one end to a cap for opening and closing an inlet, and it is slidably mounted at the other end to a guide member located near the inlet. A rotary ring is rotatably mounted around the cap, and the coupling member is coupled to a part of the rotary ring at one end thereof. Slanted blocks for removing foreign materials are provided on a portion of the rotary ring which slides with respect to the circumferential outer surface of the cap. A slide support member formed another end of the coupling member is guided by a guide member disposed on the back side of the oil filler lid. The guide member guides the slide support member in such a direction that the slide support member slides apart from a hinge.

11 Claims, 14 Drawing Sheets

CAP DEVICE

BACKGROUND OF THE INVENTION

1. Field of the Invention

The present invention relates to a cap device in which a long coupling member is coupled at one end to a cap.

The present invention is based on Japanese Patent Applications No. 2000-190697 and No. 2000-200744, which are incorporated herein by reference.

2. Description of the Related Art

This type of cap device is known as disclosed in JP-A-62-173321. FIG. 24 is a cross sectional view showing a conventional fuel tank inlet portion of a motor vehicle. In FIG. 24, a recess 102, which is opened and closed with a fuel filler lid 101, is provided at a rear part of a body panel 100 of a motor vehicle. A fuel tank inlet 104a of a filler pipe 104 is formed in its bottom wall 102a. The fuel tank inlet 104a is closed with a filler cap 110 in a sealing manner. A coupling string 114 which is slidably supported in an annular groove 111a is coupled to the filler cap 110 through a ring 112. The other end of the coupling string 114 is placed in a tubular cover 116 extending into the body panel 100.

In the conventional filler cap device, to feed fuel into the fuel tank, the fuel filler lid 101 is opened, the filler cap 110 is removed from the filler pipe 104, the coupling string 114 is drawn out of the tubular cover 116, and the filler cap 110 hangs down. To close the filler cap 110, the coupling string 114 is put into the tubular cover 116. Thus, the filler cap device is constructed so as to prevent the filler cap 110 from dropping and being lost when fuel is fed and so as not catch the coupling string 114 in the fuel filler lid 101 when the fuel filler lid 101 is tightened.

When the conventional filler cap device is used in cold districts, it frequently occurs that rainwater, snow or the like enters a clearance between the annular groove 111a of the filler cap 110 and the ring 112, and is frozen. In this case, an ice block is formed and it hinders the rotation of the ring 112. The hindering state of the rotation of the ring 112 is transmitted through the coupling string 114 to the filler cap 110. This makes it difficult to rotate the filler cap 110 itself, and hence makes it difficult to smoothly remove the filler cap 110 from the fuel tank inlet 104a.

Further, in the conventional cap structure, when fuel is fed, the filler cap 110 hangs down at a position close to the body panel 100. Accordingly, there is a fear that the filler cap 110 interferes with the fuel feed gun or comes in contact with the body panel 100 and those rub together. Further, the tubular cover 116 is deeply projected into the body panel 100. Because of this, a freedom of layout of component parts within the body panel 100 is restricted, and the construction is complex.

SUMMARY OF THE INVENTION

The present invention is directed to solve the above problem, and to provide a cap device which is free from the difficulty in attaching and detaching of the cap, which is caused by the freezing, even when it is used in cold districts.

Further the present invention is directed for solving the above problems, and has an object to provide a cap device which never interferes with a fuel feed gun and a body panel when a filler cap is removed to feed fuel, and is simple in construction.

To achieve the above object, there is provided a first cap device in which a long, flexible coupling member is coupled at one end to a filler cap for opening and closing a fuel tank inlet, and is slidably mounted at the other end to a guide member located near the fuel tank inlet, the cap device comprising:

a rotary ring being rotatably mounted around the circumferential outer surface of the filler cap and fastened to one end of the coupling member; and protrusions being provided on a surface of a part which slides when the rotary ring and the circumferential outer surface of the filler cap rotate relative to each other.

In the first cap device, when the filler cap is removed from the fuel tank inlet, the filler cap is supported at a position near the fuel tank inlet, by the coupling member. Therefore, there is no fear of losing the filler cap and failing to cap the fuel tank inlet. One end of the coupling member is fastened to the rotary ring, which is rotatably mounted on the circumference of the filler cap. When the filler cap is turned to remove it, the rotary ring and the filler cap rotate relative to each other. Therefore, if the filler cap is coupled to the slide support member, the opening and closing operations of the filler cap may be normally performed.

Protrusions are formed on a surface of a part which slides when the rotary ring and the circumferential outer surface of the filler cap rotate relative to each other. The protrusions reduce a contact area of the rotary ring and the filler cap. This reduces a freezing force at the sliding part. Further, it secures a space between the rotary ring and the outer surface of the filler cap. This space functions as a drain channel, lessening the freezing at the sliding part. The protrusions are preferably positioned on at least the lower side of the rotary ring, which is a part of the sliding part. In particular, the contact area of the lower side of the slanted block most frequently comes in contact it. Accordingly, the draining function of the groove is enhanced. Alternately, the protrusions may be positioned on the inner surface of the rotary ring and/or the side surface of the filler cap. With this, the operation and effect of the invention are further enhanced. Thus, when the protrusions may be provided on at least one of the lower side and the inner side of the sliding part of the rotary ring, and the side surface of the filler cap, the operation and effect are secured as mentioned above.

According to the second aspect of the invention, there is provided a cap device in which a long, flexible coupling member is coupled at one end to a filler cap for opening and closing a fuel tank inlet, and is slidably mounted at the other end to a guide member located near the fuel tank inlet, the cap device comprising:

a rotary ring being rotatably mounted around the circumferential outer surface of the filler cap and fastened to one end of the coupling member; and sharpened protrusions for removing foreign materials such as ice blocks being provided on a sliding part where the rotary ring and the circumferential outer surface of the filler cap slide relative to each other. According to the second aspect of the present invention, the sharpened protrusions scrap out foreign materials such as ice blocks which are present on the sliding part between the rotary ring and the filler cap. Therefore, the rotation of the filler cap is not obstructed at the rotary ring and no hindrance occurs in the opening/closing operation of the filler cap, even in environments where freezing easily occurs.

In the cap device, the sharpened protrusions are slanted in a rotating direction of the rotary ring. This feature further enhances the function of remove foreign materials such as ice blocks.

The rotary ring preferably includes drain channels which are located close to the protrusions on the inner surface of the rotary ring, and extends from the upper end to the lower end of the rotary ring. With this technical feature, the sharpened protrusions scrap out foreign materials such as ice blocks attaching to the sliding part, and discharge the scraped ones to exterior through the drain channels. As a result, a smooth rotation of the rotary ring is ensured.

According to the third aspect of the invention, there is provided a first cap device in which an fuel tank inlet of a filler pipe is located in a recess of a body panel, and which has a filler cap for hermetically closing the fuel tank inlet and fuel filler lid being turned on a hinge so as to open and close an opening of the recess, the cap device comprising:

a coupling member coupled at one end to the filler cap and at the other end to a slide support member; and a guide member, disposed on the back side of the fuel filler lid, for guiding the slide support member in such a direction that the slide support member slides apart from the hinge.

In the cap device thus constructed, when the fuel filler lid is opened through the hinge and the filler cap is removed, the coupling member coupled to the filler cap is guided by the guide member with the aid of the slide support member. The guide member guides the slide support member in such a direction that the slide support member moves apart from the hinge. That is, it guides the slide support member to a position apart from the body panel. Accordingly, the filler cap hangs down by the coupling member at a position separated from the fuel tank inlet in a state that the fuel filler lid is opened. As a result, the filler cap has moved to a position located from the fuel tank inlet and the body panel.

Thus the cap device of the invention has such a simple construction that the guide member is provided on the fuel filler lid. Further, there is no need of providing the guide in the body panel as referred to in the related art description. Therefore, other parts may be laid out with less restriction within the body panel.

It is sufficient that the guide member is provided so as to guide the slide support member to move apart from the hinge. In this case, the guide member may be provided so as to guide the slide support member to a lower position when the slide support member moves more apart from the hinge. If so done, there is less fear that the filler cap hits the fuel feed gun or the human body and moves to the body panel.

In another mode of the invention, the slide support member includes a moderating member which elastically deforms with the movement of the slide support member, the moderating member being located in the middle of the guide member. When the slide support member slides on and along the guide member, the moderating member engages the slide support member to deform, and regulates the movement of the slide support member toward the hinge side.

In another preferred mode, the guide member may include a water-proof cover for preventing water from entering a location where the slide support member slides. The water-proof cover may be shaped like a sunshade, which expands above the slide support member. When rainwater enters through a gap between the body panel and the fuel filler lid, the water-proof cover prevents the rainwater from entering a gap between the filler cap and the slit. Therefore, there is no fear water enters the gap and is frozen there, and hence the sliding operation of the slide support member is not hindered.

According to the fourth aspect of the invention, there is provided a cap device in which an fuel tank inlet of a filler pipe is located in a recess of a body panel, and which has a filler cap for hermetically closing the fuel tank inlet and a fuel filler lid being turned on a hinge so as to open and close an opening of the recess the cap device comprising:

a coupling member coupled at one end to a first slide support member and at the other end to the second slide support member;

a first guide member, disposed on the back side of the fuel filler lid, for guiding the first slide support member in such a direction that the first slide support member slides apart from the hinge; and a second guide member, disposed on the filler cap, for slidably guiding the second slide support member.

In this fourth cap device, a structure including the guide member and the slide support member, which resembles the structure of the third aspect of the cap device, is provided also in the filler cap. Specifically, the second slide support member is provided at the other end of the coupling member. The second guide member provided on the filler cap slidably supports the second slide support member. With such a construction, when the filler cap is attached to and detached from the fuel tank inlet, the second slide support member is slidably guided by the second guide member. Therefore, the operability in handling the filler cap is improved. Further, the second slide support member is slidable with respect to the second guide member, and a contact area between them is small. Even if rainwater enters a gap between the slide support member and the second guide member in environments where freezing of water easily occurs, e.g., in cold districts, the second slide support member may easily be moved with the coupling member since an area of freeing the second slide support member is narrow. For this reason, even in such environments that the freeing easily occurs, there is less fear of deteriorating the operability.

DETAILED DESCRIPTION OF THE PREFERRED EMBODIMENTS

For better understanding of the operation and effects of the present invention, the preferred embodiments of the invention will be described with reference to the accompanying drawings.

Figure 1:
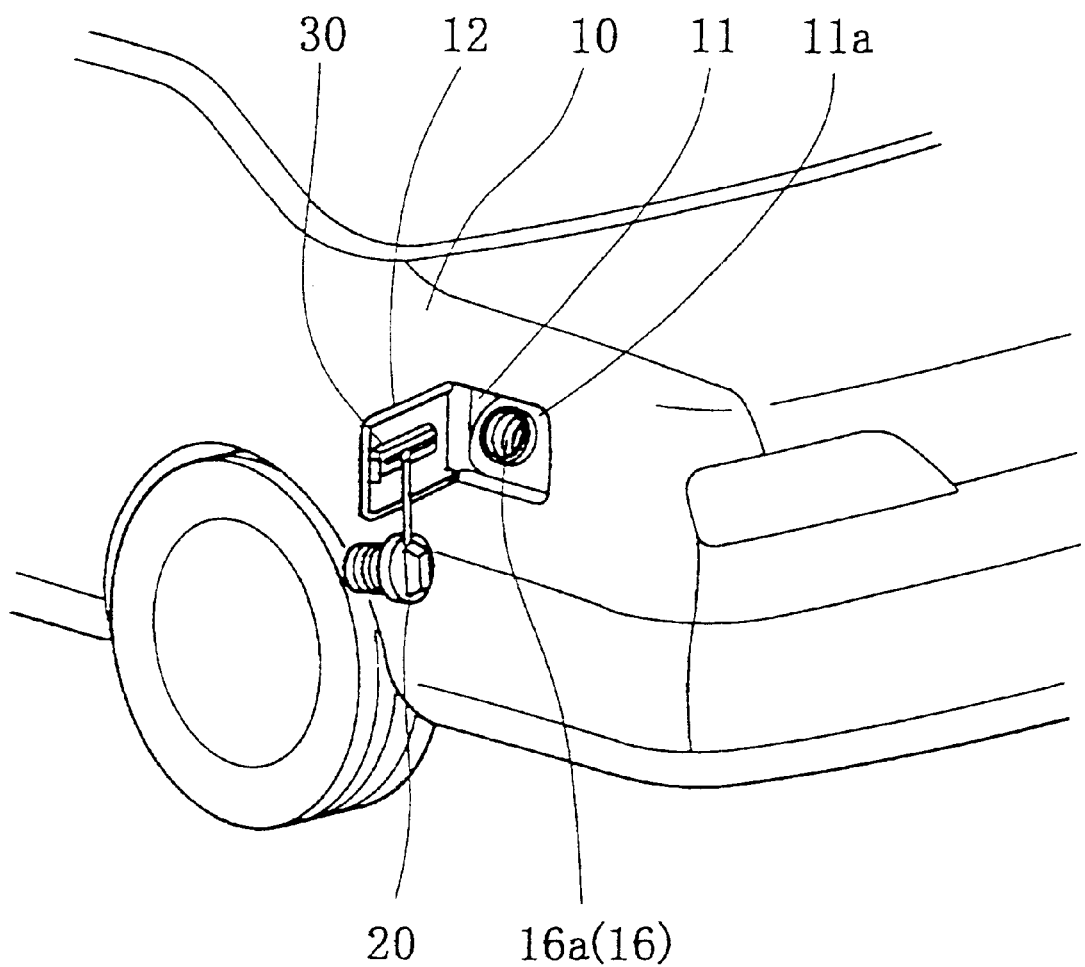
FIG. 1 is a perspective view showing a rear part of a motor vehicle according to a first embodiment of the present invention.
Figure 2:
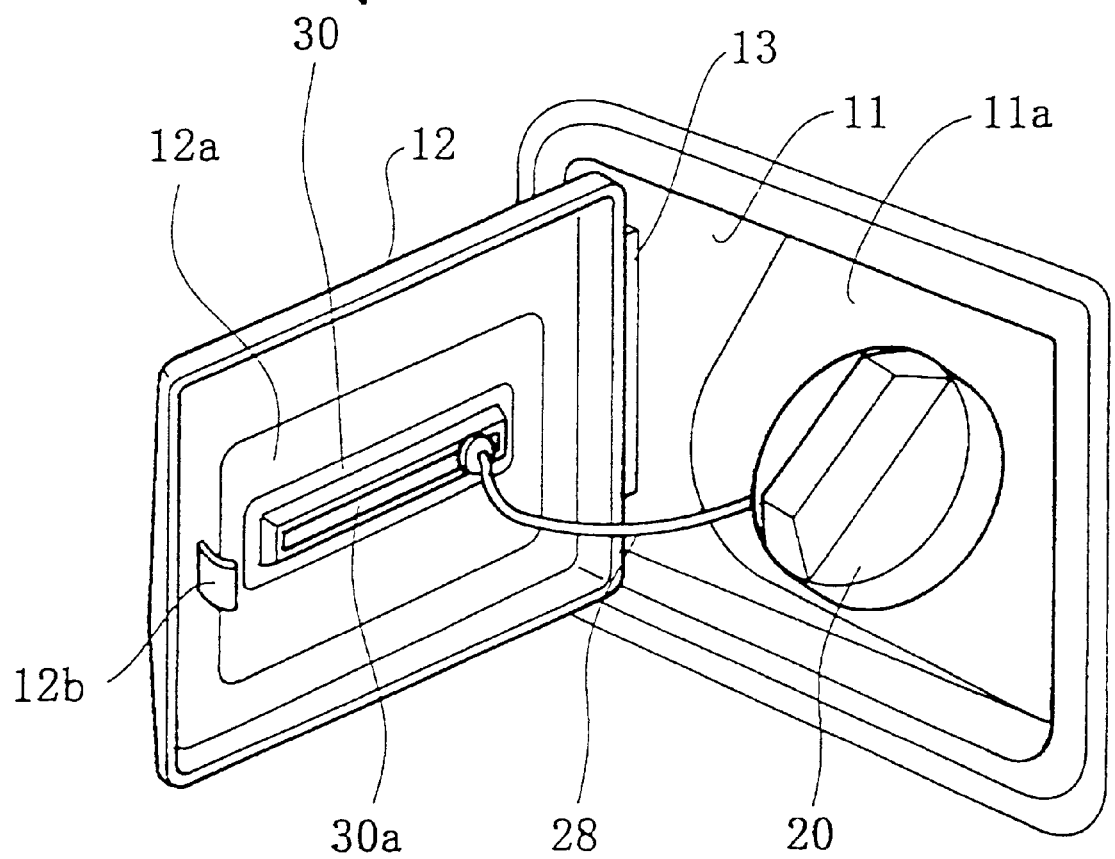
FIG. 2 is a perspective view showing a portion including a fuel tank inlet in a state that fuel filler lid is opened but a fuel is not yet injected.
Figure 3:
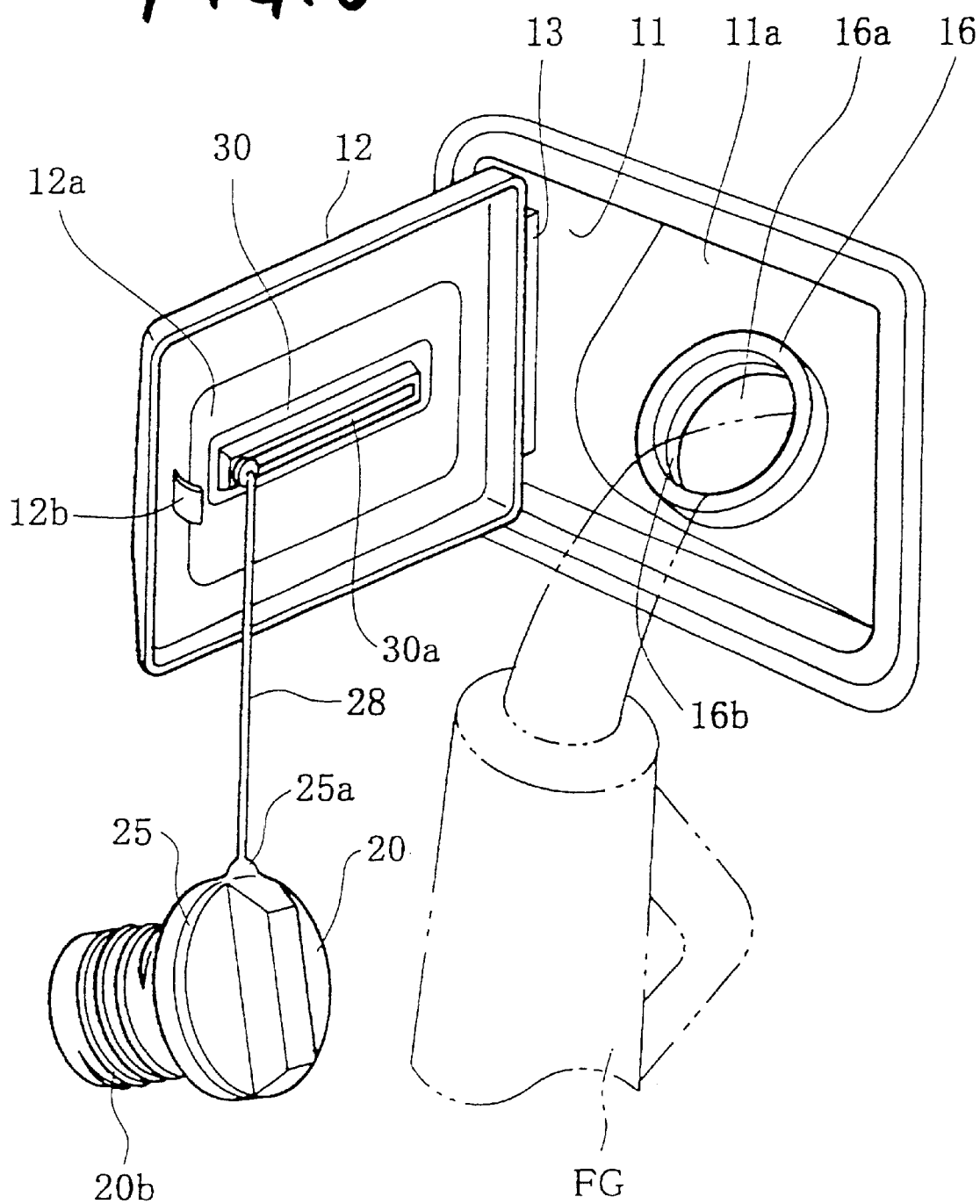
FIG. 3 is a perspective view showing the fuel tank inlet portion when fuel is fed by using a fuel feed gun.

FIG. 1 is a perspective view showing a rear part of a motor vehicle according to a first embodiment of the present invention. FIG. 2 is a perspective view showing a portion including a fuel tank inlet before a fuel is fed. FIG. 3 is a perspective view showing the fuel tank inlet portion when fuel is fed. In FIGS. 1 through 3, a recess 11 for fuel feeding is formed in the rear part of a body panel 10, and an opening of the recess 11 is covered with a fuel filler lid 12. The fuel filler lid 12 is mounted through a hinge 13(FIG. 2) so as to be opened and closed. A fuel tank inlet 16a of a filler pipe 16 to be connected to a fuel tank (not shown) is disposed in the bottom wall 11a of the recess 11. The fuel tank inlet 16a is hermetically closed with the filler cap 20 so as to be opened and closed.

Figure 4:
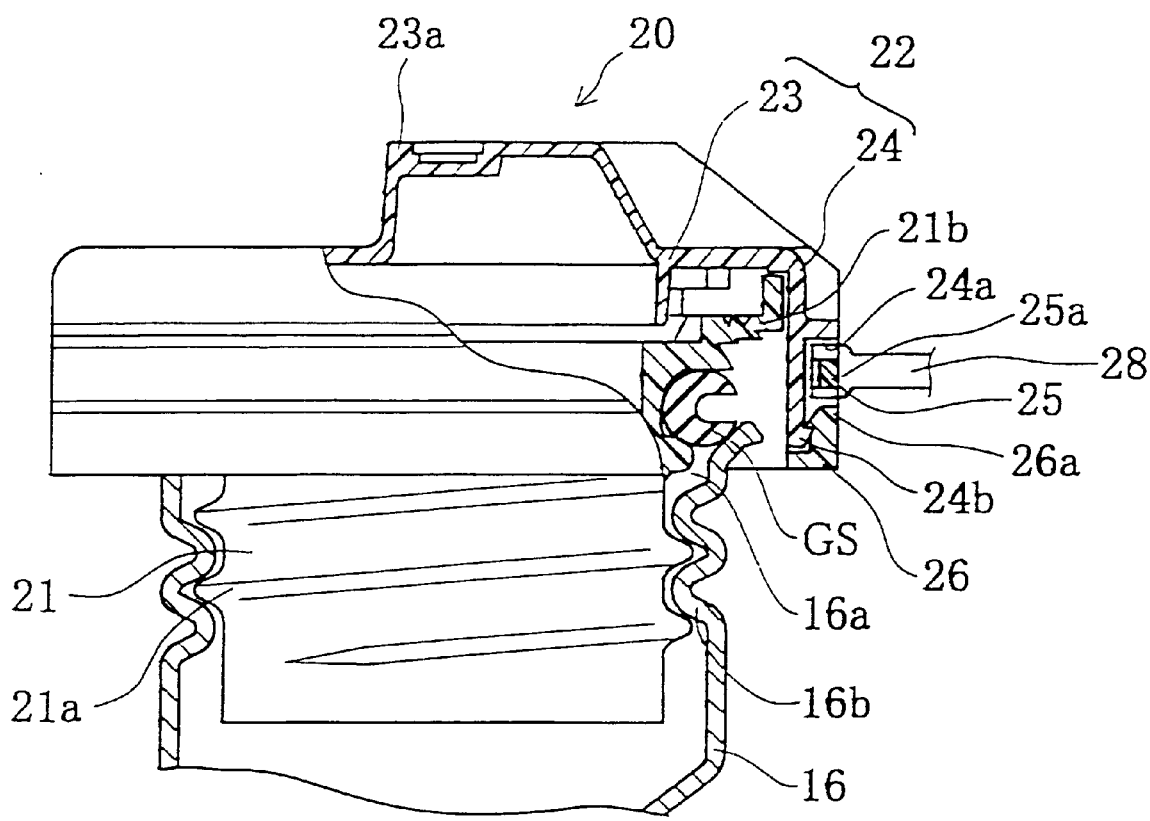
FIG. 4 is a side view, partly broken, showing a filler cap being attached to a filler pipe.

FIG. 4 is a side view, partly broken, showing a filler cap 20 being attached to a filler pipe 16. In FIG. 4, the filler cap 20 includes a casing 21 mounted to the filler pipe 16, a cap body 22 mounted on a flange 21b provided in the upper part of the casing 21, and a gasket GS provided in the upper part of the casing 21. A threaded part 21a is formed on the circumferential outer surface of the casing 21. When the threaded part 21a is screwed into a threaded part 16b of the filler pipe 16, it presses the gasket GS against the inner wall of the filler pipe 16, thereby sealing a clearance present therebetween.

The cap body 22 is shaped like a cup and defined by an upper wall 23 having an operating part 23a, which is picked with operator's fingers and turned, and a side wall 24 tubularly raised from the circumference of the upper wall 23. A rotary ring 25 and a retaining ring 26 are mounted on the side wall 24. Specifically, an annular groove 24a is formed over and in the entire circumference of the side wall 24. The rotary ring 25 is put in the annular groove 24a. The retaining ring 26 is located under the rotary ring 25 to prevent the rotary ring 25 from falling off. More specifically, an engaging pawl 26a of the retaining ring 26 comes into engagement with an engaging pawl 24b formed on a lower end of the side wall 24, so that the rotary ring 25 is rotatably mounted on the side wall 24 while being prevented from falling off.

Figure 6:
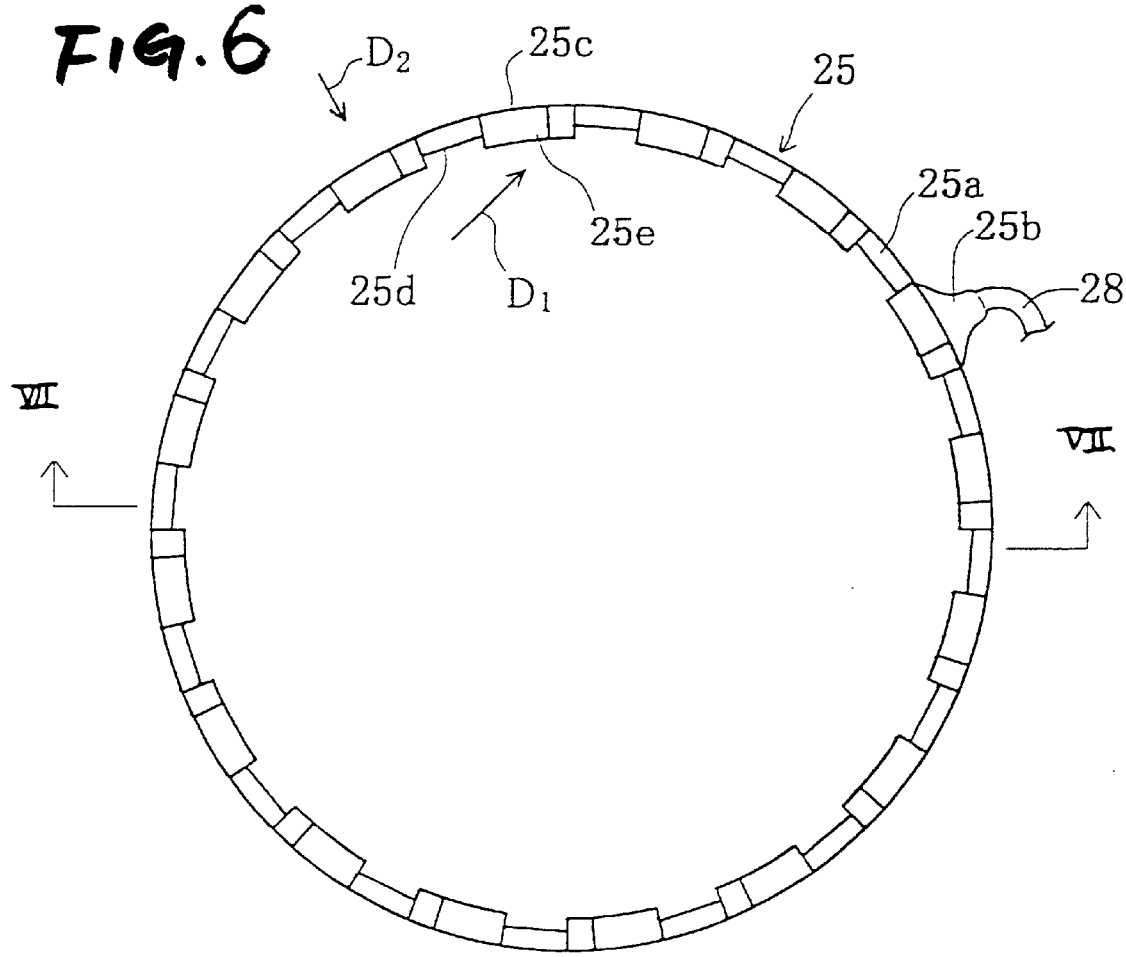
FIG. 6 is a plan view showing a rotary ring.
Figure 7:
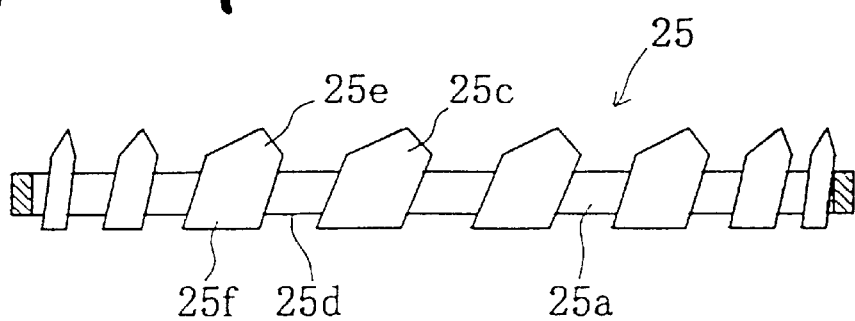
FIG. 7 is a cross sectional view taken on line VII—VII in FIG. 6.
Figure 8:
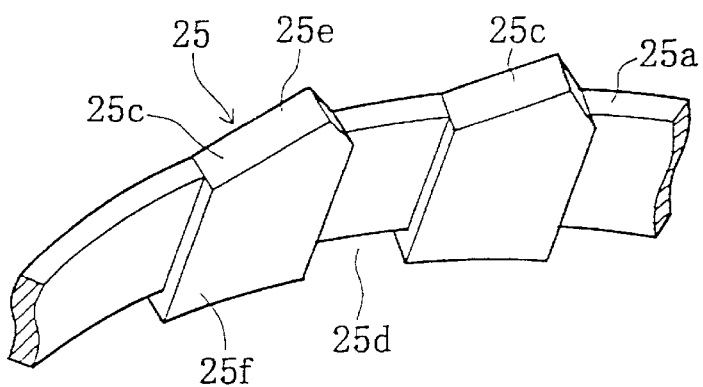
FIG. 8 is a perspective view showing a part of the rotary ring when viewed in an obliquely upward direction D1 in FIG. 6.
Figure 9:
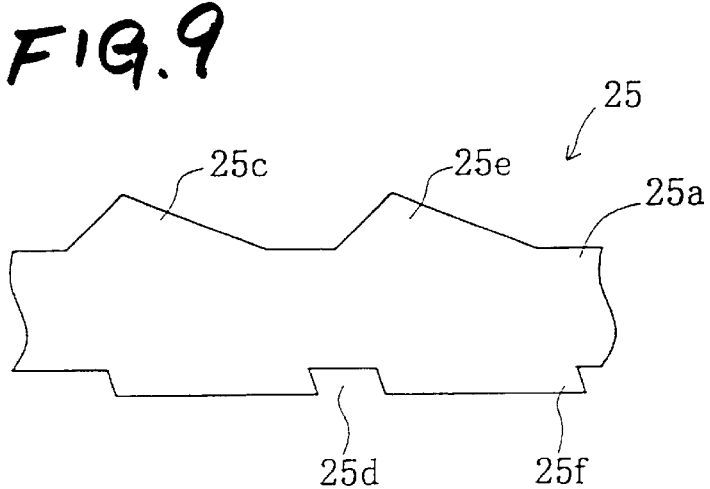
FIG. 9 is a diagram showing the rotary ring when viewed in a direction of D2 in FIG. 6.

FIG. 6 is a plan view showing a rotary ring 25. FIG. 7 is a cross sectional view taken on line VII—VII in FIG. 6. FIG. 8 is a perspective view showing a part of the rotary ring when viewed in an obliquely upward direction D1 in FIG. 6. FIG. 9 is a plan view showing a part of the rotary ring when viewed in an direction D2 in FIG. 6. In those figures, the rotary ring 25 includes an ring body 25a, and slanted blocks 25c (corresponding to "protrusions" in the description defining the present invention) are equiangularly arranged along the ring body 25a. Each of those slanted blocks 25c is slanted at a given angle of any of 10° to 80° to the clockwise direction, and a drain channel 25d is located between the adjacent slanted blocks 25c. Each of the slanted blocks 25c includes an upper edge 25e triangularly shaped on the top, and a bottom edge 25f. This bottom edge 25f includes a flat surface whose ends are both defined by sharply shaped corners. Accordingly, the upper triangular edges 25e are annularly arranged in a saw-tooth fashion. The bottom edge 25f of the slanted block has a flat surface so as to allow the slanted block to smoothly slide on and along the annular groove 24a. When viewed upward from its lower end, its sharp corner is directed to the counterclockwise direction.

A mounting part 25b is formed at a part of the circumference of the rotary ring 25, and one end (referred to as a first end) of a coupling member 28 is fastened to the mounting part 25b.

Figure 5:
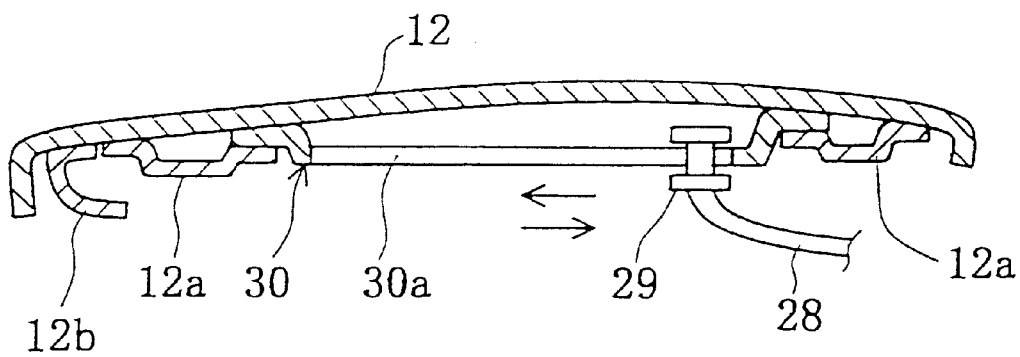
FIG. 5 is a cross sectional view showing fuel filler lid when viewed in the horizontal direction.

The coupling member 28 shown in FIGS. 2 and 3 is a long member, such as a string formed of fuel-resistant resin fibers or a metallic chain. It is mounted while somewhat loosened, in a FIG. 2 state that the filler cap 20 is fastened to the fuel tank inlet 16a. FIG. 5 is a cross sectional view showing the fuel filler lid 12 when viewed in the horizontal direction. The coupling member 28 is slidably supported on a guide member 30 that is provided on the back side of the fuel filler lid 12. The guide member 30, while extending horizontally, is formed on the back side of the fuel filler lid 12. That is, when the fuel filler lid 12 is opened, the guide member 30 so formed moves apart from the body panel 10. A slit 30a is longitudinally formed in the guide member 30. A slide support member 29, which is fixed to the other end (referred to as a second end) of the coupling member 28, is slidably supported in the slit 30a. The slide support member 29 is integrally formed with the coupling member 28. A reinforcing panel 12a and an engaging piece 12b for tightening the fuel filler lid 12 are fixed to the back side of the fuel filler lid 12 by spot welding.

In the embodiment, to feed the fuel, as shown in FIG. 2, the fuel filler lid 12 is opened, and the filler cap 20 is removed and moved apart from the body panel 10. Then, as shown in FIG. 3, the slide support member 29 is pulled to the exterior side of the body panel 10 with the coupling member 28, and moved along the slit 30a of the guide member 30. Then, the operator releases the filler cap 20 from his hand, and then the filler cap 20 hangs down at a position apart from ht body panel 10. In this state, the operation may feed fuel to the fuel tank.

Thus, at the time of fuel supplying, the filler cap 20 is disposed at a position apart form the body panel 10. Accordingly, it does not interfere with the fuel feed gun FG, and there is less fear that the filler cap 20 hits the body panel 10 and rubs the latter.

When the fuel feeding ends and the operator closes the fuel tank inlet 16a with the filler cap 20, the slide support member 29 is pulled with the aid of the coupling member 28 coupled to the filler cap 20, and moved along the guide member 30 to the hinge side. Accordingly, when the fuel filler lid 12 is closed, there is no fear that when the fuel filler lid 12 is closed, the coupling member 28 is caught in the fuel filler lid 12.

Further, the cap device of the embodiment has such a simple construction that the guide member 30 is coupled to the fuel filler lid 12, and the second end of the coupling member 28 coupled to the filler cap 20 is slidably supported on the guide member 30. Furthermore, there is no need of putting the guide into the body panel 10, while the putting of the guide into the body panel is essential in the conventional art as already referred to. Accordingly, no limitation is placed on the layout of other parts within the body panel 10.

In the cap device, one end of the coupling member 28 is fastened to the rotary ring 25 which is rotatably mounted on the outer circumference of the filler cap 20. When the filler cap 20 is rotated, it rotates relative to the rotary ring 25. Accordingly, even if the filler cap 20 is coupled to the coupling member 28, the filler cap 20 may be normally opened and closed without any restriction by the coupling member 28 if it is coupled to the coupling member 28.

Further as shown in FIGS. 6 through 9, when the filler cap 20 is rotated relative to the rotary ring 25, the upper triangular edges 25e and the bottom edges 25f provided in the rotary ring 25 scrape out with the sharp edge parts the ice block or the like which is present on the sliding part between the rotary ring 25 and the annular groove 24a, and quickly discharge out the resultant through the drain channel 25d. Thus, even when an ice block is present near the rotary ring 25, the rotation of the filler cap 20 is not obstructed by it. Even in environments where freezing easily occurs, no hindrance occurs in the opening/closing operation of the filler cap 20.

Figure 10:
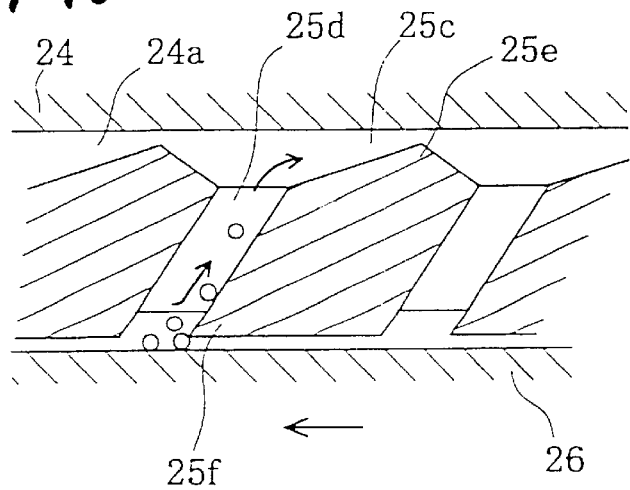
FIG. 10 is an explanatory diagram for explaining an operation of the rotary ring.

Furthermore, as shown in FIG. 10, when the filler cap 20 is rotated in a counterclockwise direction to remove the filler cap 20, the upper triangular edge 25e and the bottom edge 25f of the rotation ring 25 move on the ice block or the like. Accordingly, the ice block or the like is easily removed. And it is quickly discharged outside through the drain channel 25d. Accordingly, the relative and smooth rotation of the rotary ring 25 and the filler cap 20 is maintained more reliably.

Presence of the slanted blocks 25c reduces the contact area of the rotary ring 25 and the annular groove 24a. This facilitates a smooth rotation of the rotary ring 25, and reduces a freezing force at the sliding part. Further, it secures a space between the rotary ring 25 and the annular groove 24a. This space functions as a drain channel, lessening the freezing. In particular, the bottom faces of the slanted blocks 25c most frequently come in contact with the annular groove 24a. Accordingly, that effect is enhanced.

Figure 11:
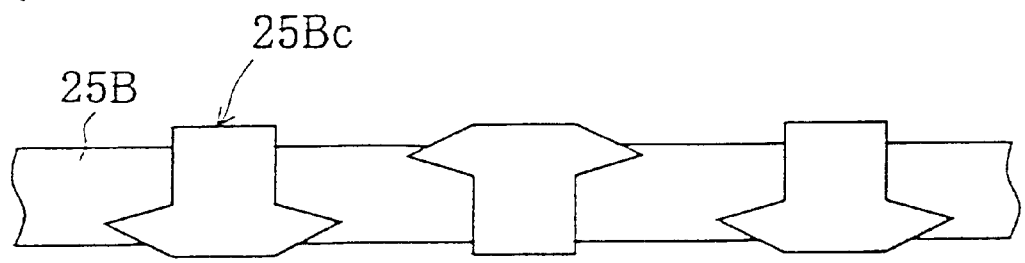
FIG. 11 is an explanatory diagram showing a key portion of a rotary ring as a modification of the first embodiment.
Figure 12:
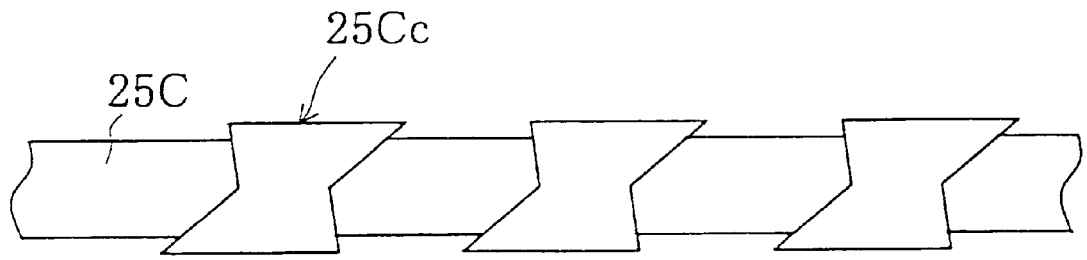
FIG. 12 is an explanatory diagram showing a key portion of a rotary ring as another modification of the first embodiment.
Figure 13:
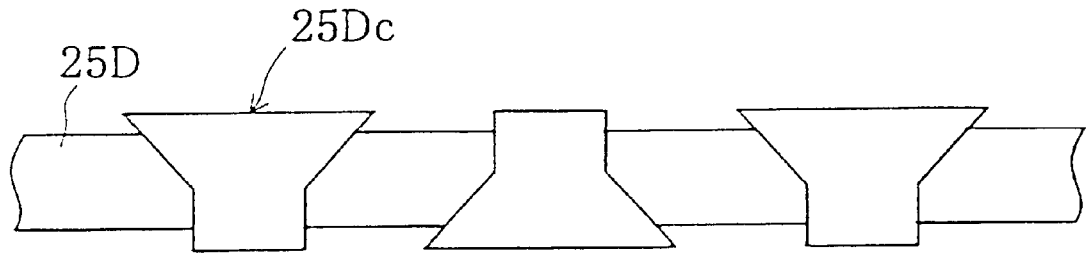
FIG. 13 is an explanatory diagram showing a key portion of a rotary ring as yet another modification of the first embodiment.

FIGS. 11 to 13 are explanatory diagrams for explaining other forms of the rotary ring used in the cap device, which is constructed according the second aspect of the present invention.

Those modifications are characteristically featured in the forms of the slanted blocks of the rotary ring. Those slanted blocks 25Bc of a rotary ring 25B shown in FIG. 11 are each shaped like a mushroom, and those mushroom-shaped slanted blocks are arranged on and along the rotary ring while being alternately inverted on and along a rotary ring. Slanted blocks 25Cc of the rotary ring 25C shown in FIG. 12 are each shaped like Z, and those Z-shape slanted blocks are arranged on and along the rotary ring at appropriate spatial intervals. Slanted blocks 25Dc of a rotary ring 25D of FIG. 13 are each shaped like Y, and those Y-shaped slanted blocks are arranged on and along the rotary ring while being alternately inverted. The upper and lower ends of those slanted blocks have sharp edges for enhancing the function of removing ice blocks.

Figure 14:
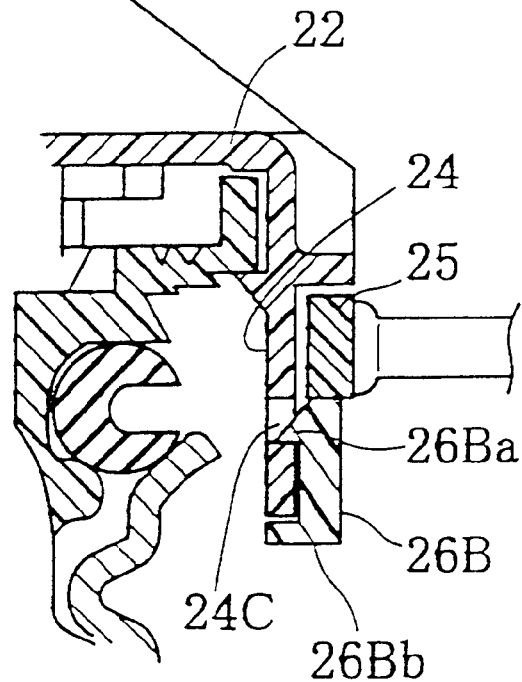
FIG. 14 is a cross sectional view showing the upper side of a filler cap which constitutes a second embodiment of the present invention.
Figure 15:
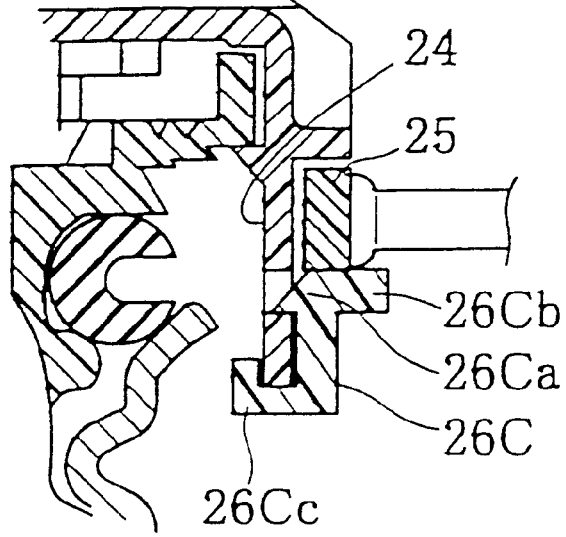
FIG. 15 is a cross sectional view showing the upper side of a filler cap which is a modification of the FIG. 14 filler cap.
Figure 16:
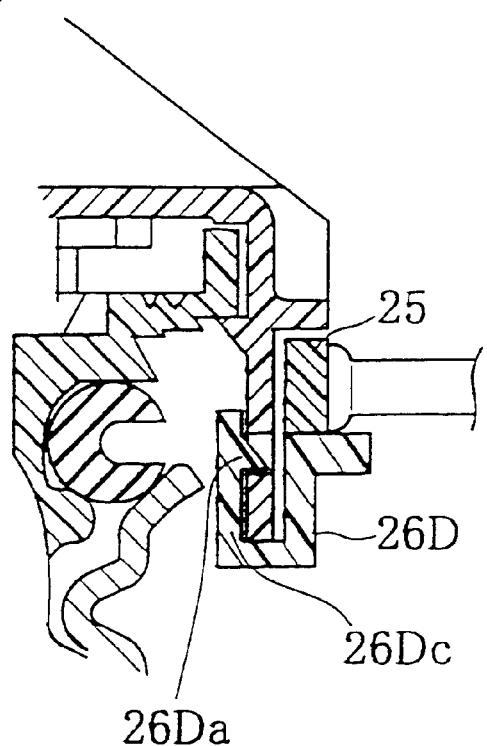
FIG. 16 is a cross sectional view showing the upper side of a filler cap which is another modification of the FIG. 14 filler cap.
Figure 17:
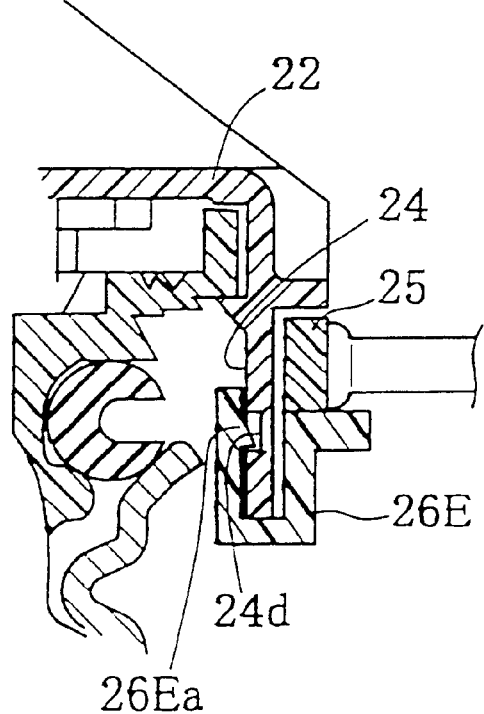
FIG. 17 is a cross sectional view showing the upper side of a filler cap which is yet another modification of the FIG. 14 filler cap.

FIGS. 14 to 17 are cross sectional views showing the upper side of four modifications of a third aspect of the present invention. Those embodiments are each characteristically featured in a configuration of the retaining ring and its mounting structure. In FIG. 14, an engaging hole 24C for mounting a retaining ring 26B is formed in the side wall 24 of the cap body 22. Specifically, the retaining ring 26B includes an engaging pawl 26Ba provided on the inner surface thereof and a support end 26Bb coming in contact with the lower end face of the side wall 24. The engaging pawl 26Ba engages into the engaging hole 24C, and the support end 26Bb is in contact with the lower end of the side wall 24. In this way, the retaining ring 26B is mounted on the side wall 24. In the structure, a protrusion (corresponding to the engaging pawl 24b in FIG. 4) is not protruded from the circumferential outer surface of the side wall 24. Use of only the upper and lower molds for cutting suffices for the forming of the cap body 22 by injection molding. In other words, slide mold for moving the semi-product sideways is not used. Accordingly, the manufacturing of the mold assembly is easy, thus leading to cost reduction. Another construction of the retaining ring is shown in FIG. 15. As shown, an engaging pawl 26Ca is formed on the inner side of the retaining ring 26C. Further, a receiving part 26Cb which receives the rotary ring 25 at its upper part of the retaining ring 26C may be provided in order to make its rotation smooth, and a receiving part 26Cc which comes in contact with the lower end of the side wall 24 may be provided in order to increase a strength of its mounting on the side wall 24. Still another construction of the retaining ring is shown in FIG. 16. A receiving part 26Dc is provided at the lower part of the retaining ring 26D such that it surrounds the lower part of the side wall 24 and has an engaging pawl 26Da. The engaging pawl 26Da engages into the engaging hole 24c, from the inner side of the side wall 24. Further, as shown in FIG. 17, a retaining ring 26E may be stopped at a recess 24d formed on the side wall 24 in place of the engaging hole as mentioned above.

Figure 18:
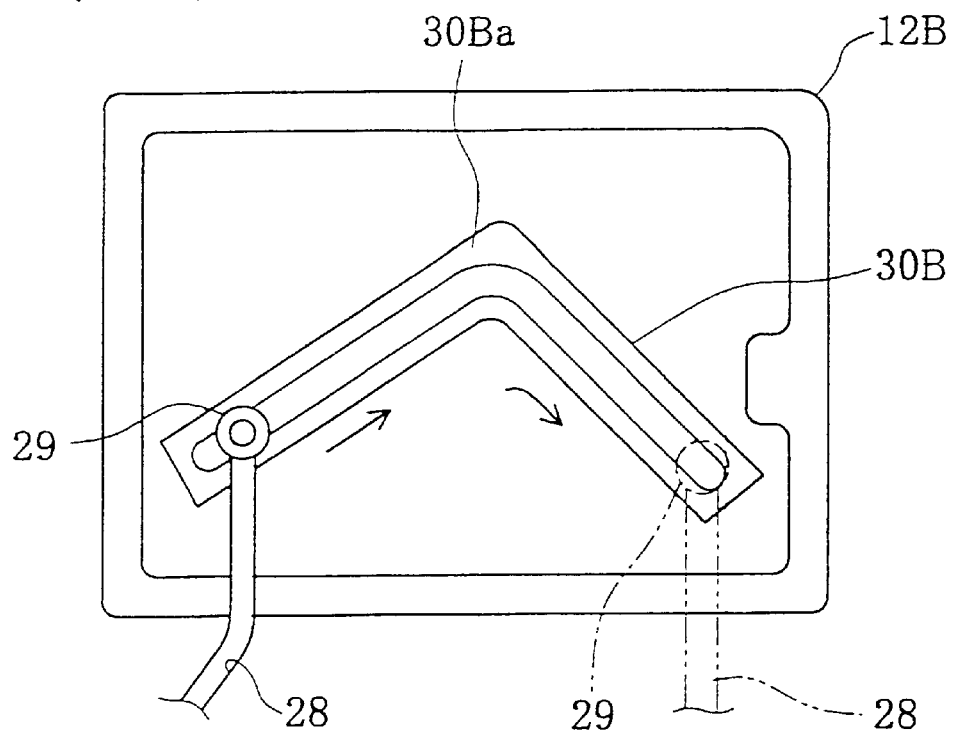
FIG. 18 is an explanatory for explaining a fourth embodiment of the invention.

FIG. 18 is an explanatory for explaining a fourth embodiment of the invention. A filler cap illustrated in FIG. 18 is characterized in that a guide member 30B is formed in an inverted-V shape. Specifically, the guide member 30B has a peak part 30Ba. When the fuel filler lid 12B is closed, the guide member 30B holds the slide support member 29 at the hinge side. When to feed fuel, the fuel filler lid 12B is opened and the filler cap is removed, the slide support member 29 gets over the peak part 30Ba and moves to the outside. When in this state, the fuel feed gun or the hand hits the filler cap, the slide support member 29 does not get over the peak part 30Ba. Accordingly, there is no case that it reaches a position where it is easy to hit the fuel feed gun. When the fuel feeding operation ends and the fuel tank inlet is closed with the filler cap, the slide support member 29 climbs over the peak part 30Ba of the guide member 30B, and returns to its original position. At this time, nothing hinders the closing operation of the filler cap.

Figure 19:
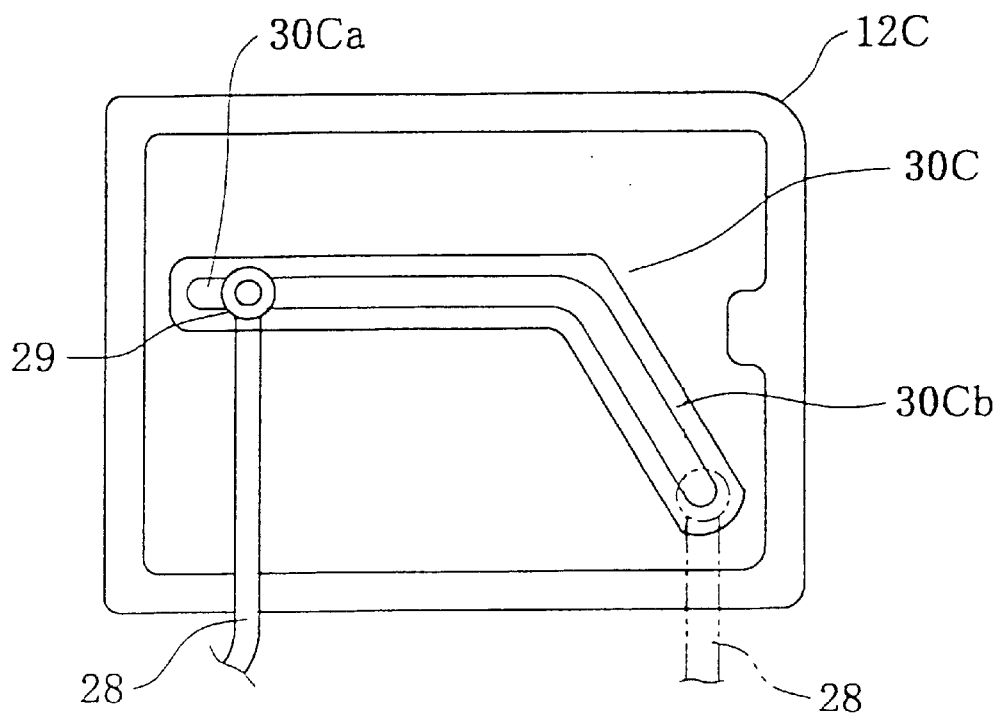
FIG. 19 is an explanatory diagram for explaining a modification of the fourth embodiment.

In a modification of the FIG. 18 structure, as shown in FIG. 19, a guide member 30C that is mounted on the fuel filler lid 12C in FIG. 19 may be configured such that a part 30C$b$ of the guide member which is located apart from the body panel is located at a position lower than a part 30C$a$ thereof. Thus, the modification provides such a construction that when the slide support member 29 is located at the position of the part 30C$b$ in the guide member 30C, the slide support member 29 is not easily moved.

Figure 20A:
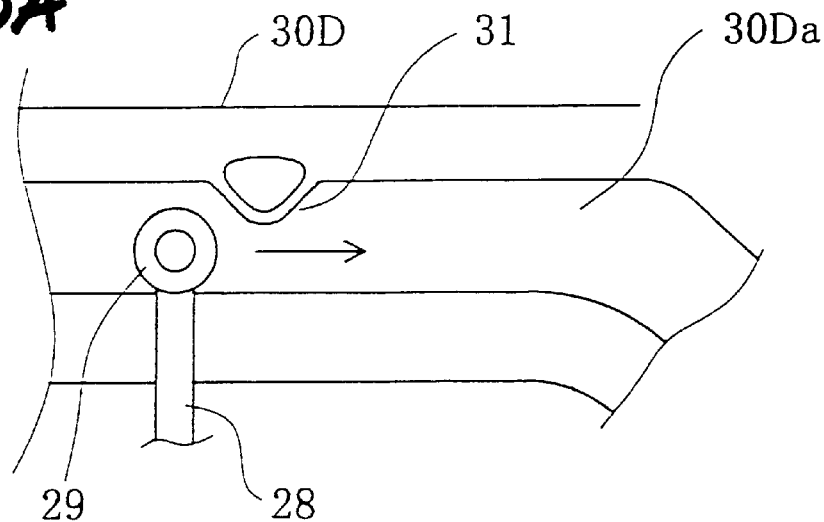
FIGS. 20A and 20B are diagrams useful in explaining a key portion of a guide member, which constitute a fifth embodiment of the present invention.
Figure 20B:
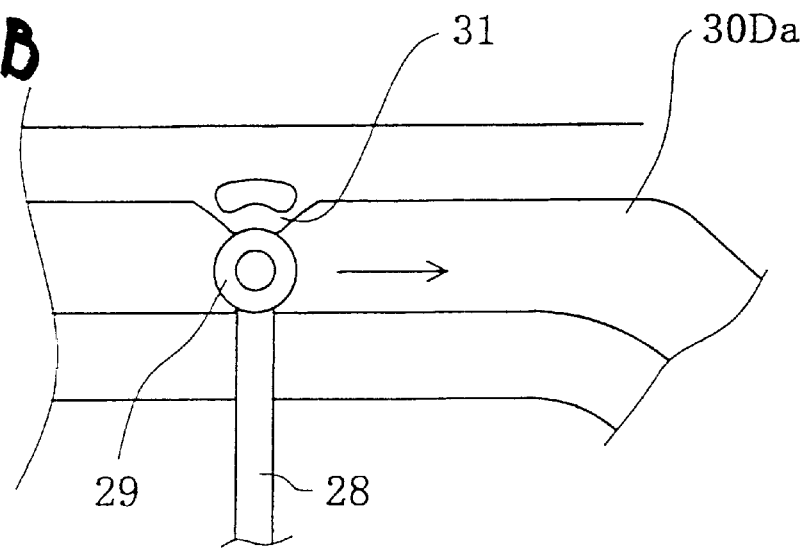

FIGS. 20A and 20B are diagrams useful in explaining a key portion of the guide member, which constitute a fifth embodiment of the present invention. In FIGS. 20A and 20B, a guide member 30D includes an elastic regulating rib (moderating member) 31, which is projected into a slit 30D$a$. The elastic regulating rib 31 regulates a movement of the slide support member 29 with a moderate feeling. Specifically, as shown in FIGS. 8A to 8B, when the slide support member 29 moves slides in and along the slit 30D$a$, it is necessary that the slide support member elastically deforms the elastic regulating rib 31 and climbs over it. When the slide support member 29 moves along the guide member 30D, its movement is moderated by the elastic regulating rib 31. Accordingly, if the filler cap collides with the fuel feed gun or the human body, it never moves close to the body panel.

Figure 21:
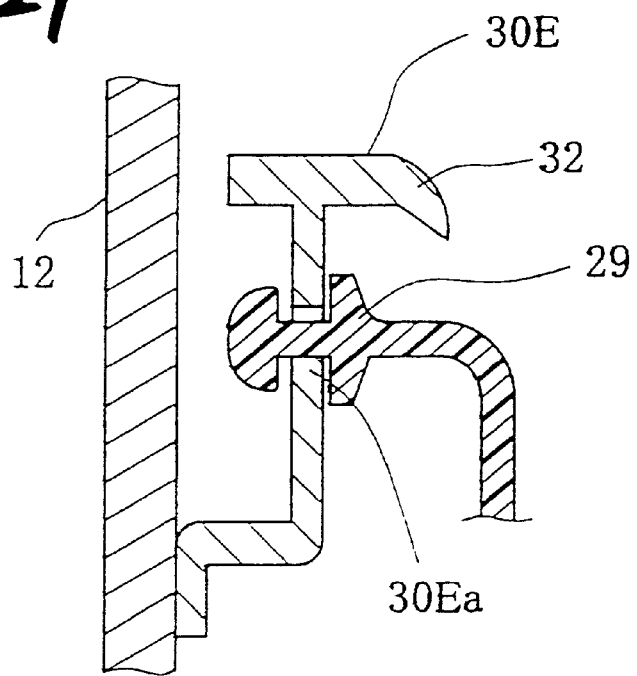
FIG. 21 is a longitudinal sectional view showing as a structure including a guide member of a fuel filler lid, which constitutes a sixth embodiment of the invention, and its related portion.

FIG. 21 is a longitudinal sectional view showing as a structure including a guide member 30E of an fuel filler lid 12E, which constitutes a sixth embodiment of the invention, and its related portion. In FIG. 21, a water-proof cover 32 is provided above the guide member 30E mounted on the back side of the fuel filler lid 12E in a state that it is protruded in the longitudinal direction. As shown, the water-proof cover 32 is shaped like a sunshade, which expands above the slide support member 29. When rainwater enters through a gap between the body panel and the fuel filler lid 12E, the water-proof cover 32 prevents the rainwater from entering a gap between the filler cap and the slit 3OE$a$. Therefore, there is no fear water enters the gap and is frozen there, and hence the sliding operation of the slide support ember 29 is not hindered.

Figure 22:
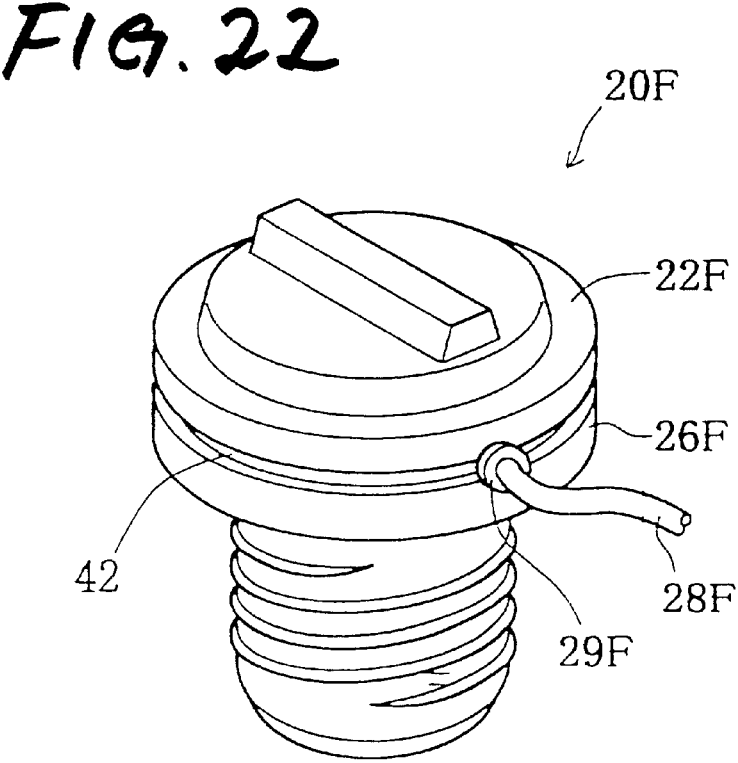
FIG. 22 is a perspective view showing a filler cap which constitutes a seventh embodiment of the invention.
Figure 23:
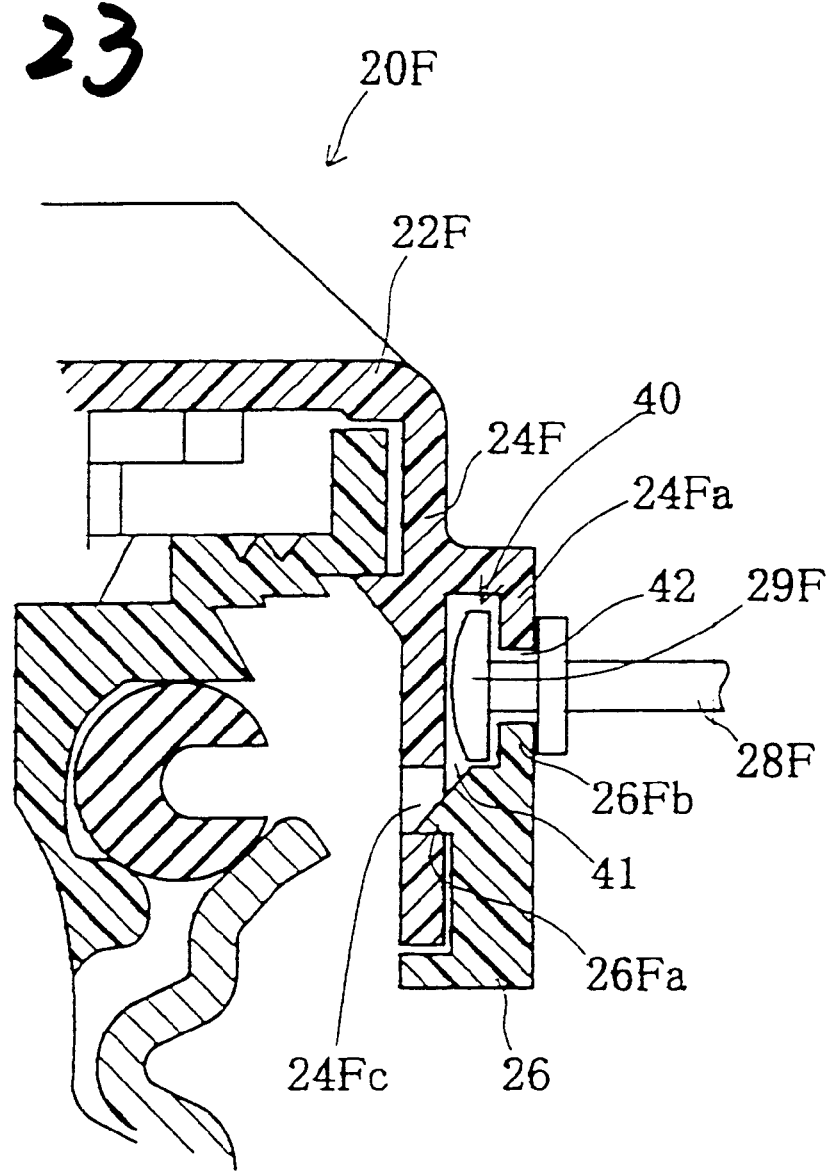
FIG. 23 is a cross sectional view showing the upper side of a filler cap of the seventh embodiment.
Figure 24:
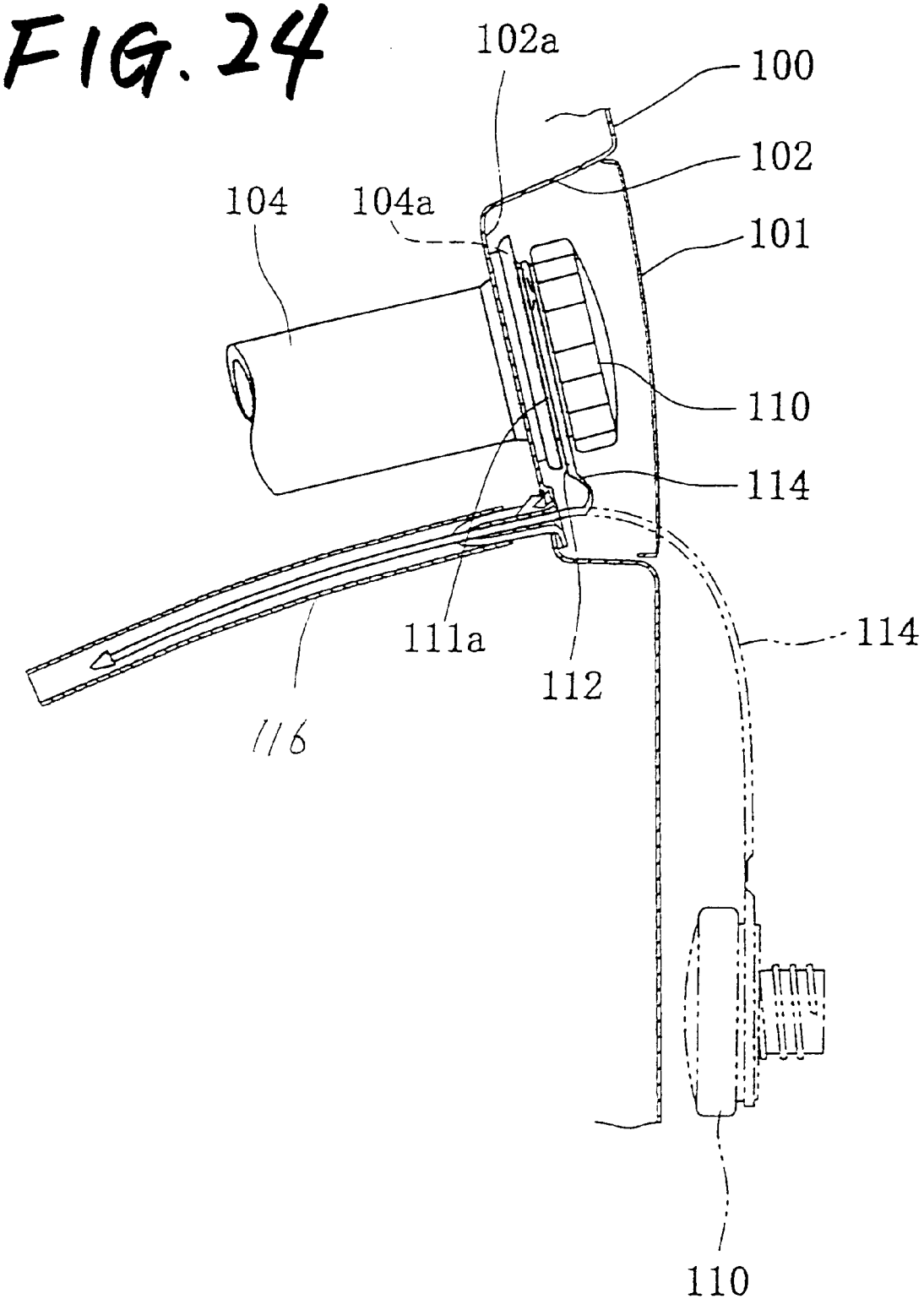
FIG. 24 is a cross sectional view showing a conventional fuel tank inlet portion of a motor vehicle.

FIG. 22 is a perspective view showing a filler cap 20F which forms a seventh embodiment of the present invention. FIG. 23 is a cross sectional view showing the upper side of the filler cap 20F. The fifth embodiment is characterized in that the filler cap includes a guide member (a second guide member in the description defining the invention) for slidably supporting the coupling member, as the fuel filler lid does. Referring to FIGS. 22 and 23, in guide member 40, an upper support end 24F$a$ being protruded downward from the side wall 24F of a cap body 22F and a retaining ring 26F located under the upper support end 24F$a$ cooperate to form a ring-like guide groove 41. The retaining ring 26F is mounted on the side wall 24F by an engaging pawl 26F$a$ with an engaging hole 24F$c$ of the side wall 24F. In the upper part of the retaining ring 26F, a lower support end 26F$b$ is formed so as to secure a slit 42, which is spaced from the upper support end 24F$a$ by a predetermined clearance. A slide support member 29F is formed at one end of a coupling member 28F. The slide support member 29F is slidably supported by the guide groove 41 and the slit 42, and is prevented from falling off the filler cap 20F. When the filler cap 20F is attached to and detached from the fuel tank inlet, the slide support member 29F of the coupling member 28F is slidably moved by the guide member 40. Accordingly, the operability in handling the filler cap 20F is improved. A contact area between the slide support member 29F and the guide groove 41 when the former is standstill on the guide groove 41 is large when comparing with that in the above embodiments. Even if rainwater enters the guide groove 41 in environments where freezing of water easily occurs, e.g., in cold districts, the slide support member 29F may easily be moved with the coupling member 28F since an area of freeing the slide support member 29F is narrow. For this reason, even in such environments that the freeing easily occurs, there is less fear of deteriorating the operability.

It should be understood that the present invention is not limited to the above-mentioned embodiments, but may variously be modified, altered and changed within the true spirits of the invention. An example of such is as given below.

1) The "protrusions" in the embodiments mentioned above are the slanted blocks protruded from the inner wall and the lower face of the rotary ring. If required, those protrusions may be protruded from the inner wall or the lower face of the rotary ring.

2) In the above-mentioned embodiments, the protruded parts of the slanted block are sharpened. If required, those parts may be chamfered. If so shaped, the rotary ring and the filler cap may be smoothly rotated relative to each other. Accordingly, a freezing force acting between them is reduced.

3) In the embodiments, the slide support member and the coupling member are formed in a unit form. The slide support member may taken any form if it is slidable with respect to the guide member.

4) While the filler cap was discussed in the embodiments, the present invention may be applied to any type of cap if it is used in environments where water is easy to be frozen. A specific example of such is a cap used in a radiator of the motor vehicle.

What is claimed is:

1. A cap device, comprising:
a cap for opening and closing an inlet;
a flexible coupling member coupled to said cap at one end thereof; and
a rotary ring mounted around a circumferential outer surface of said cap so as to relatively rotate to said cap and attached to said one end of said coupling member;
wherein protrusions are provided in at least a lower surface side of a sliding portion of said cap device where said rotary ring and the circumferential outer surface of said cap slide with each other.

2. A cap device according to claim 1,
wherein said protrusions are protruded from any of an inner surface of said rotary ring and a side surface of said cap.

3. A cap device according to claim 2,
wherein said protrusions are slanted in a rotating direction of said rotary ring.

4. A cap device according to claim 2,
wherein drain channels extending across said sliding portion are formed between each adjacent protrusion.

5. A cap device according to claim 1, further comprising blocks provided on said sliding portion so as to form said protrusions.

6. A cap device according to claim 5,
wherein said protrusions are slanted in a rotating direction of said rotary ring.

7. A cap device according to claim 5,
wherein drain channels extending across said sliding portion are formed between each adjacent protrusion.

8. A cap device, comprising:

a cap for opening and closing an inlet;

a flexible coupling member coupled to said cap at one end thereof; and a rotary ring mounted around a circumferential outer surface of said cap so as to relatively rotate to said cap and attached to said one end of said coupling member;

wherein sharpened protrusions for removing foreign materials are provided on a sliding portion of the cap device where said rotary ring and the circumferential outer surface of said cap relatively slide with each other said protrusions are slanted in a rotating direction of said rotary ring.

9. A cap device according to claim 8, wherein drain channels extending across said sliding portion are formed between each adjacent protrusion.

10. A cap device according to claim 8, further comprising blocks provided on said sliding portion so as to form said protrusions.

11. A cap device according to claim 10, wherein drain channels extending across said sliding portion are formed between each adjacent protrusion.

* * * * *